US012576410B2

(12) United States Patent
Höglund et al.

(10) Patent No.: US 12,576,410 B2
(45) Date of Patent: Mar. 17, 2026

(54) CENTRIFUGAL SEPARATION SYSTEM AND METHOD WITH FLOW CONTROL TO A HEAVY PHASE RECEIVING CONTAINER

(71) Applicant: Alfa Laval Corporate AB, Lund (SE)

(72) Inventors: Kasper Höglund, Rönninge (SE); Peter Thorwid, Sundbyberg (SE); Staffan Königsson, Tumba (SE)

(73) Assignee: ALFA LAVAL CORPORATE AB, Lund (SE)

( * ) Notice: Subject to any disclaimer, the term of this patent is extended or adjusted under 35 U.S.C. 154(b) by 1029 days.

(21) Appl. No.: 17/296,714

(22) PCT Filed: Dec. 9, 2019

(86) PCT No.: PCT/EP2019/084150
§ 371 (c)(1),
(2) Date: May 25, 2021

(87) PCT Pub. No.: WO2020/120366
PCT Pub. Date: Jun. 18, 2020

(65) Prior Publication Data

US 2022/0023892 A1 Jan. 27, 2022

(30) Foreign Application Priority Data

Dec. 10, 2018 (EP) .................................... 18211238
Dec. 10, 2018 (EP) .................................... 18211242
(Continued)

(51) Int. Cl.
*B04B 13/00* (2006.01)
*B04B 1/08* (2006.01)
(Continued)

(52) U.S. Cl.
CPC ................ *B04B 13/00* (2013.01); *B04B 1/08* (2013.01); *B04B 7/14* (2013.01); *B04B 11/02* (2013.01); *B04B 2013/006* (2013.01)

(58) Field of Classification Search
CPC .. B04B 13/00; B04B 1/08; B04B 7/14; B04B 11/02; B04B 2013/006; B04B 1/04;
(Continued)

(56) References Cited

U.S. PATENT DOCUMENTS 6,358,193 B1 3/2002 Nyberg
8,182,408 B2 5/2012 Isaksson et al.
(Continued)

FOREIGN PATENT DOCUMENTS

CN 101189068 A 5/2008
CN 201669169 U 12/2010
(Continued)

OTHER PUBLICATIONS

English Translation of Korean Office Action for Korean Application No. 10-2021-7021241, dated Jan. 16, 2023.
(Continued)

*Primary Examiner* — Claire X Wang
*Assistant Examiner* — Shuyi S. Liu
(74) *Attorney, Agent, or Firm* — Birch, Stewart, Kolasch & Birch, LLP

(57) ABSTRACT

A centrifugal separation system includes a centrifugal separator, a liquid feed mixture conduit, a light phase conduit, a heavy phase conduit, and a flow control system. The flow control system includes a controller, a flow control valve arranged in a light phase conduit, a liquid feed mixture measuring device, and at a light phase measuring device and/or a heavy phase measuring device. The controller is configured to control the flow control valve based on measurements from the liquid feed mixture measuring device
(Continued)

and measurements from the light phase measuring device and/or the heavy phase measuring device.

21 Claims, 5 Drawing Sheets

(30) Foreign Application Priority Data

Dec. 10, 2018 (EP) .................................... 18211243
Feb. 20, 2019 (EP) .................................... 19158273

(51) Int. Cl.
*B04B 7/14* (2006.01)
*B04B 11/02* (2006.01)

(58) Field of Classification Search
CPC .... B04B 9/02; B04B 9/08; B04B 9/12; B04B 7/08; B04B 7/12; B04B 5/0442; B04B 11/05; B01D 21/262; B01D 17/0217; B01D 53/24; B01D 21/02; B01D 21/245; B01D 45/12; B01D 59/20; B01D 21/2427; B01D 2221/04; B01D 2311/2676; C02F 1/38; C02F 11/127; A61M 1/3693; A61M 1/3696; B29B 2017/0231; C12M 33/10; C12M 45/05; C12M 27/10; C12M 47/02; B03B 5/32; F16C 2320/42; G01N 2030/381; G01N 2001/2846; B03C 3/15; F25B 11/04; C08C 1/10
USPC ............................ 494/43, 65, 66, 68, 70, 72
See application file for complete search history.

(56) References Cited

U.S. PATENT DOCUMENTS 9,186,687 B2 11/2015 Häggmark et al.
9,931,646 B2 4/2018 Isaksson et al.
2007/0173397 A1* 7/2007 Hinman .................. B04B 11/04 210/744
2009/0298666 A1 12/2009 Träger et al.
2011/0319248 A1* 12/2011 Starbard .................. B04B 1/08 494/45
2013/0055623 A1* 3/2013 Iversen .................. C10G 1/086 422/187
2016/0184836 A1 6/2016 Mackel et al.
2016/0271626 A1 9/2016 Bergström et al.
2017/0189915 A1 7/2017 Mackel et al.
2017/0203306 A1 7/2017 Penki et al.

FOREIGN PATENT DOCUMENTS

CN 104338618 B 1/2017
CN 118742653 A * 10/2024 ................ C12F 3/02
EP 0241128 A1 * 10/1987 ............. B04B 11/02
EP 0346056 A2 * 12/1989 ............... B04B 1/08
EP 2181744 A1 * 5/2010 ......... B01D 17/0217
EP 2 868 210 A1 5/2015
JP H0615198 A * 1/1994 ............. B04B 11/02
KR 10-2010-0005323 A 1/2010
WO WO-9000862 A1 * 2/1990 ........... A23C 9/1508
WO WO 2011/004007 A1 1/2011
WO WO 2011/093784 A1 8/2011
WO WO 2014/000829 A1 1/2014
WO WO 2015/181175 A2 12/2015
WO WO 2015/181177 A1 12/2015
WO WO-2016170091 A1 * 10/2016 ......... B01D 17/0217

OTHER PUBLICATIONS

International Search Report, issued in PCT/EP2019/084150, dated Feb. 17, 2020.
Written Opinion of the International Searching Authority, issued in PCT/EP2019/084150, dated Feb. 17, 2020.
English translation of Japanese Office Action for Japanese Application No. 2021-532957, dated Jun. 27, 2022.

* cited by examiner

CENTRIFUGAL SEPARATION SYSTEM AND METHOD WITH FLOW CONTROL TO A HEAVY PHASE RECEIVING CONTAINER

TECHNICAL FIELD

The invention relates to a centrifugal separation system comprising inter alia a centrifugal separator, and to a method of controlling a centrifugal separation system. The invention further relates to a computer program and to a computer-readable storage medium.

BACKGROUND

During use of a mechanically hermetically sealed centrifugal separator, no air is present inside the separator and thus, no liquid/air interfaces are formed inside the separator. Thus, a pressure change at one of an inlet, and/or outlet for light phase, and/or outlet for heavy phase will affect the pressure at the other of the inlet and/or outlets. Put differently, the inlet and outlets of a mechanically hermetically sealed centrifugal separator form communicating vessels.

WO 2011/093784 and EP 2868210 disclose systems comprising mechanically hermetically sealed centrifugal separators.

WO 2011/093784 discloses a system comprising a hermetic centrifugal separator where the separator comprises a rotor including a separation chamber, an inlet channel for a mixture of components to be separated, a first outlet channel for receiving at least one separated light component, and a second outlet channel for receiving at least one separated heavy component. The system further comprises recirculation means for recirculating from said second outlet channel to said separation chamber part of the separated heavy component, a first monitoring means monitoring density, flow rate, or combination thereof, of the heavy component flowing in said second outlet channel, and a first control means controlling recirculation flow rate in response to a control signal from said first monitoring means. The system controls the characteristics of the separated heavy component even when feeding the separator with a feed of varying contents.

EP 2868210 discloses a method for citrus fruit processing comprising the steps of introducing liquid citrus fruit material to be processed via an inlet to a centrifugal separator being mechanically hermetically sealed at the inlet and at the liquid outlets; separating the citrus fruit material in the separator to obtain at least a liquid heavy phase and a liquid light phase, wherein the density of the liquid heavy phase is higher than the density of the liquid light phase; discharging the liquid heavy phase via a liquid heavy phase outlet and the liquid light phase via a liquid light phase outlet of the separator; measuring at least one parameter of the discharged liquid heavy phase and/or liquid light phase, wherein the parameter is related to a concentration of the heavy phase in the liquid light phase, or vice versa; and adjusting the counter pressure of the liquid heavy phase outlet with respect to the liquid light phase outlet, or vice versa, based on the measurement so as to control the concentration of the heavy phase in the liquid light phase, or vice versa, discharged from the separator.

SUMMARY

Some liquid feed mixtures and the heavy phases separated from such liquid feed mixtures are more sensitive, e.g. to shear forces, than others.

Accordingly, it is an object of the invention to provide a separation system, which provides conditions for gentle treatment of a separated heavy phase. To address this, a centrifugal separation system having the features defined in one of the independent claims is provided.

According to an aspect of the invention, the object is achieved by a centrifugal separation system comprising a centrifugal separator, a liquid feed mixture conduit, a light phase conduit, a heavy phase conduit, and a flow control system, wherein the centrifugal separator comprises a rotor configured to rotate about an axis of rotation and being provided with a separation space, a stack of separation discs arranged inside the separation space, a first stationary portion arranged at a first axial end of the rotor, a second stationary portion arranged at the second axial end of the rotor, wherein an inlet passage extends into the separation space via the first or second stationary portion, a light phase outlet passage extends from the separation space via the first or second stationary portion, a heavy phase outlet passage extends from the separation space via the first or second stationary portion, wherein the heavy phase outlet passage comprises at least one channel extending within the rotor from a radially outer portion of the separation space towards a central portion of the rotor, wherein each of the inlet passage, the light phase outlet passage, and the heavy phase outlet passage is mechanically hermetically sealed between the rotor and respective of the first and second stationary portions, wherein the inlet passage enters the rotor centrally on the axis of rotation at R0, the heavy phase outlet passage exits the rotor at a first radius R1, and the light phase outlet passage exits the rotor at a second radius R2, wherein R2≥R1≥R0 and R2>R0, wherein the flow control system comprises a control unit, a flow control valve arranged in the light phase conduit, a liquid feed mixture measuring device, and a light phase measuring device and/or a heavy phase measuring device, and wherein the control unit is configured to control the flow control valve based on measurements from the liquid feed mixture measuring device and measurements from the light phase measuring device and/or the heavy phase measuring device.

Since the inlet and outlet passages are mechanically hermetically sealed, the inlet passage enters the rotor centrally, since the flow control system comprises the flow control valve arranged in the light phase conduit, the liquid feed mixture measuring device, and the light phase measuring device and/or the heavy phase measuring device, and since the control unit is configured to control the flow control valve based on measurements from the liquid feed mixture measuring device and measurements from the light phase measuring device and/or the heavy phase measuring device, a centrifugal separation system is provided wherein conditions are provided for the heavy phase to be subjected to a gentle treatment. As a result, the above mentioned object is achieved.

It is a further object of the invention to provide a method of controlling a centrifugal separation system which method provides conditions for a gentle treatment of a separated heavy phase. To address this, a method having the features defined in one of the independent claims is provided.

Thus, according to a further aspect of the invention, the object is achieved by a method of controlling a centrifugal separation system, the centrifugal separation system comprising a centrifugal separator, a liquid feed mixture conduit, a light phase conduit, a heavy phase conduit, and a flow control system, wherein the centrifugal separator comprises a rotor configured to rotate about an axis of rotation and being provided with a separation space, a stack of separation discs arranged inside the separation space, a first stationary portion arranged at a first axial end of the rotor, a second stationary portion arranged at the second axial end of the rotor, wherein an inlet passage extends into the separation space via the first or second stationary portion, a light phase outlet passage extends from the separation space via the first or second stationary portion, a heavy phase outlet passage extends from the separation space via the first or second stationary portion, wherein the heavy phase outlet passage comprises at least one channel extending within the rotor from a radially outer portion of the separation space towards a central portion of the rotor, wherein each of the inlet passage, the light phase outlet passage, and the heavy phase outlet passage is mechanically hermetically sealed between the rotor and respective of the first and second stationary portions, wherein the inlet passage enters the rotor centrally on the axis of rotation at R0, the heavy phase outlet passage exits the rotor at a first radius R1, and the light phase outlet passage exits the rotor at a second radius R2, wherein R2≥R1≥R0 and R2>R0, wherein the flow control system comprises a flow control valve arranged in the light phase conduit, a liquid feed mixture measuring device, and a light phase measuring device and/or a heavy phase measuring device, and wherein the method comprises steps of:

rotating the rotor, conducting a flow of liquid feed mixture into the separation space via the liquid feed mixture conduit and the inlet passage, separating the liquid feed mixture into a heavy phase and a light phase in the separation space, measuring the flow of liquid feed mixture, measuring a flow of light phase and/or a flow of heavy phase, and controlling the flow control valve based on measurements acquired in the step of measuring the flow of liquid feed mixture and measurements acquired in the step of measuring the flow of light phase and/or the flow of heavy phase.

Since the inlet and outlet passages are mechanically hermetically sealed, the inlet passage enters the rotor centrally, since the flow control system comprises the flow control valve arranged in the light phase conduit, and since the method comprises the steps of:

measuring the flow of liquid feed mixture, measuring a flow of light phase and/or a flow of heavy phase, and controlling the flow control valve arranged in the light phase conduit based on measurements acquired in the step of measuring the flow of liquid feed mixture and measurements acquired in the step of measuring the flow of light phase and/or the flow of heavy phase, a method of controlling a centrifugal separation system is provided wherein conditions are provided for the heavy phase to be subjected to a gentle treatment. As a result, the above mentioned object is achieved.

More specifically, the mechanically hermetically sealed centrifugal separator with its inlet as well as at its heavy phase outlet at, or close to, the axis of rotation provides for gentle admittance of the liquid feed mixture to be separated into the centrifugal separator and a gentle exit of the separated heavy phase from the centrifugal separator. Moreover, since the flow control valve is arranged in the light phase conduit and the inlet and outlets of the mechanically hermetically sealed centrifugal separator form communicating vessels, no flow control devices are necessary in the heavy phase conduit during separation of a liquid feed mixture in the centrifugal separation system. Thus, no flow restrictions which would subject the heavy phase to shear forces need to be provided in the heavy phase conduit. Accordingly, provisions are provided for the heavy phase to be subjected to gentle treatment as it flows towards a heavy phase collecting container or further processing steps following and arranged after the centrifugal separation system.

The centrifugal separator is a high speed centrifugal separator wherein the rotor is rotated by a drive arrangement comprising e.g. an electric motor. The rotor may be rotated at several thousand RPM such that the liquid feed mixture may be subjected to a high G-force. The separation discs provide for a highly efficient separation of the liquid feed mixture into the light and heavy phases.

The at least one channel may be formed by one or more tubes having substantially the same cross-sectional area at the radially outer portion as closer towards the axis of rotation. Alternatively, the at least one channel may be formed by one or more passages having a larger cross-sectional area at the radially outer portion than closer towards the axis of rotation.

The mechanical hermetical seals of the inlet passage and the outlet passages are provided by sealing members. It is remarked that a mechanical hermetical seal forms a completely different interface between rotating and stationary parts of the centrifugal separator than a hydraulic seal comprising e.g. paring discs arranged inside paring chambers, and/or submerged retaining discs. A mechanical hermetical seal includes an abutment between part of the rotor and a stationary portion. A hydraulic seal does not include an abutment between the rotatable rotor and stationary parts of a centrifugal separator.

The light phase outlet passage and the heavy phase outlet passage may be the only outlets from the rotor.

Arranging the inlet passage such that it enters the rotor centrally on the axis of rotation provides for a gentle transition of the liquid feed mixture from the inlet passage to the rotating rotor. Arranging the heavy phase outlet passage where it exits the rotor at a smaller radius, R1, than the radius, R2, of the exit of the light phase outlet passage from the rotor requires more feed pressure to be able to force the heavy phase closer towards the axis of rotation, than if the heavy and light phase outlet passages were arranged the other way round. However, the heavy phase exit from the rotor closer to the axis of rotation provides for a gentle transition of the heavy phase from the rotating rotor into the stationary heavy phase outlet passage.

Accordingly, when R1<R2, i.e. R2>R1, the heavy phase outlet passage exits the rotor at a small radius which provides for a gentle exit of the heavy phase from the rotor and the centrifugal separator.

The flow control system is configured for controlling the separation of the liquid feed mixture into the light phase and the heavy phase in the separation system. In particular, the flow control system is configured to control the flow of liquid feed mixture and the light and heavy phases through the centrifugal separator. The main means of controlling this flow is the flow control valve arranged in the light phase conduit.

The liquid feed mixture is fed into the centrifugal separator, e.g. by subjecting the liquid feed mixture to pressure, and the flow control valve is controlled to provide a clean light phase in the light phase outlet passage as well as a heavy phase which flows continuously in the heavy phase outlet passage. A clean light phase is a light phase substantially free from heavy phase and/or particles.

This means that a radial position of an interface between the light and heavy liquid phases, a so-called E-line, inside the separation space is controlled by the flow control valve such that separated clean light phase reaches the light phase outlet passage and separated heavy phase reaches the at least one channel at the radially outer portion of the separation space. The E-line, equilibrium line, is a simplification of an intermediate zone as a distinct interface between the light and heavy phases. In practice there is a concentration gradient in the intermediate zone.

The liquid feed mixture is formed by a mixture of the light phase and the heavy phase. The light phase is a liquid. The heavy phase may be a liquid with a higher density than the light phase. Alternatively, the heavy phase may comprise particles suspended in a liquid, e.g. particles suspended in the liquid forming the light phase. The particles may be cells. The cells may be mammalian cells such as CHO (Chinese Hamster Ovary) cells. The liquid feed mixture may be a cell culture mixture, and the separated light phase may contain an extracellular biomolecule that has been expressed by the cells during fermentation. The heavy phase may be a high concentration cell containing liquid. The high concentration cell containing liquid may be reused in a fermentation process subsequent to the separation of a batch of the liquid feed mixture.

According to embodiments, the liquid feed mixture conduit may be configured to be connected to a source of pressurised liquid feed mixture. In this manner, the liquid feed mixture may be fed into the centrifugal separator via the liquid feed mixture conduit. The source of pressurised liquid feed mixture may be provided in the form of a number of alternative embodiments.

According to some embodiments, the centrifugal separation system may comprise a feed pump arranged in the liquid feed mixture conduit. In this manner, the liquid feed mixture may be fed into the centrifugal separator via the liquid feed mixture conduit by the feed pump. Accordingly, the feed pump may form part of the source of pressurised liquid feed mixture.

According to some embodiments, the centrifugal separation system may comprise a liquid feed mixture container and means for controlling a pressure within the liquid feed mixture container. In this manner, the liquid feed mixture may be fed into the centrifugal separator via the liquid feed mixture conduit. Accordingly, such a pressurised liquid feed mixture container may form a source of pressurised liquid feed mixture.

According to a further embodiment, the centrifugal separation system may comprise a liquid feed mixture container, which is suspended at an elevated position in relation to the centrifugal separator. The difference in height between the liquid feed mixture container and the centrifugal separator may provide a pressure sufficient for feeding the liquid feed mixture into the centrifugal separator via the liquid feed mixture conduit extending from the liquid feed mixture container to the inlet passage.

According to embodiments, the heavy phase conduit may be configured to extend to a heavy phase receiving container. The heavy phase conduit may form an unrestricted passage from the centrifugal separator to the heavy phase receiving container when a flow of heavy phase exists from the heavy phase outlet passage to the heavy phase receiving container. In this manner, the heavy phase is not subjected to any substantial shear forces as it flows from the centrifugal separator to the heavy phase receiving container. Thus, the heavy phase may flow gently from the centrifugal separator to the heavy phase receiving container. The gentle flow may be particularly advantageous when the heavy phase comprises cells. In practice, this may entail that the heavy phase conduit lacks any throttling flow control devices, which would provide a restricted flow passage.

The heavy phase conduit may comprise means for shutting off the flow of heavy phase through the heavy phase conduit. However, as mentioned above, when a flow of heavy phase exists from the heavy phase outlet passage to the heavy phase receiving container, the heavy phase conduit forms an unrestricted passage. The means for shutting off the flow of heavy phase does not affect the heavy phase when there is a flow of heavy phase through the means for shutting off.

The heavy phase receiving container may be a container for storage of the heavy phase separated from a batch of liquid feed mixture. Alternatively, the heavy phase receiving container may be a container for intermediate or partial storage of the heavy phase before it continues to further processing following the separation system.

According to embodiments, the centrifugal separation system may comprise a shut-off valve arranged in the heavy phase conduit. In this manner, when the shut-off valve is closed, a flow through the heavy phase conduit may be prevented. For instance, when the centrifugal separation system is being started up and before a first amount of heavy phase has been separated in the separation space, a flow through the heavy phase conduit of liquid feed mixture and/or only partly separated heavy phase may not be desired. Thus, the shut-off valve may be maintained closed during start-up. Once a certain amount of heavy phase has been separated within the separation space, the shut-off valve may be opened to permit a flow of heavy phase through the heavy phase conduit. Accordingly, the shut-off valve has only two alternative positions, a fully closed position in which no flow can pass the shut-off valve, and a fully open position in which a flow can pass the shut-off valve unrestrictedly. Thus, the shut-off valve is not a throttling flow control device. The shut-off valve is an example of the means for shutting off the flow of heavy phase.

According to embodiments of the method, wherein the centrifugal separation system comprises a shut-off valve arranged in the heavy phase conduit, the method may comprise steps of:

- maintaining the shut-off valve closed during an initial separation phase of separating a batch of liquid feed mixture while an interface between the light phase and heavy phase forms within the separation space, and
- maintaining the shut-off valve fully open during a main separation phase of separating the batch of liquid feed mixture when the interface has formed. In this manner, a certain amount of heavy phase may be separated within the separation space before the shut-off valve is opened. Thus, a flow through the heavy phase conduit of liquid feed mixture and/or only partly separated heavy phase may be avoided.

According to embodiments, the centrifugal separator may comprise an exchangeable separation insert, wherein the exchangeable insert comprises a rotor casing, and the first and second stationary portions, arranged at respective axial ends of the rotor casing. The rotor casing may form part of the rotor of the centrifugal separator and comprises the separation space, the separation discs, and the at least one channel. In this manner, the centrifugal separation system may be adapted for separation of a single batch of liquid feed mixture or a limited number of batches of liquid feed mixture. After separation of the batch or batches of liquid feed mixture, the exchangeable separation insert may be removed from the centrifugal separator and replaced with a new exchangeable separation insert. This may be advantageous, for instance when the liquid feed mixture is a cell culture mixture. Treatment of a cell culture mixture, such as separation of a cell culture mixture, may have to be performed in a sterile environment. Utilising exchangeable separation inserts in the centrifugal separator, may provide for a sterile interior, i.e. a sterile flow path, for the liquid feed mixture and the separated light and heavy phases by the provision of sterilised exchangeable separation inserts.

According to embodiments, the rotor may comprise a rotatable member and the rotor casing of the exchangeable separation insert. The rotor casing may be engaged in an inner space of the rotatable member. In this manner, the rotor casing of the exchangeable separation insert may be brought to rotate together with the rotatable member.

When a currently used exchangeable separation insert is to be replaced with a new exchangeable separation insert, the rotor casing of the currently used exchangeable separation insert is released from engagement with the rotatable member to provide for the replacement.

According to embodiments, the centrifugal separation system may comprise a liquid feed mixture container, wherein a stirring member may be arranged within the liquid feed mixture container. In this manner, an even concentration of the liquid feed mixture within the liquid feed mixture container may be ensured. The provision of the even concentration of the liquid feed mixture may provide for substantially steady operating conditions of the centrifugal separation system, and in particular for the centrifugal separator. Moreover, with knowledge about the proportions of the light phase and the heavy phase in the liquid feed mixture, the even concentration of the liquid feed mixture may provide basis for controlling settings to be utilised by the control unit.

According to embodiments, the measurements from the liquid feed measuring device may relate to a flow of liquid feed mixture, the measurements from the light phase measuring device and/or the heavy phase measuring device may relate to a flow of light phase and/or a flow of heavy phase, wherein the control unit may be configured to control the flow control valve towards a desired relationship between the flow of liquid feed mixture and the flow of light phase and/or the a flow of heavy phase. In this manner, a desired concentration of the heavy phase and/or a desired degree of clarification of the light phase may be achieved.

According to embodiments of the method, the step of controlling the flow control valve may comprise a step of:

controlling the flow control valve towards a desired relationship between the flow of liquid feed mixture and the flow of light phase and/or the flow of heavy phase. In this manner, a desired concentration of the heavy phase and/or a desired degree of clarification of the light phase may be achieved.

The desired relationship between the flow of liquid feed mixture and the flow of light phase or the flow of heavy phase may be set by a user of the separation system. The desired relationship may be chosen based on e.g. a desired concentration of the heavy phase, the proportions of the light and heavy phases in the liquid feed mixture, a desired degree of clarification of the light phase, and a particle content of the liquid feed mixture such as a packed cell volume, PCV, of the liquid feed mixture.

The concentration of the liquid feed mixture may be constant over substantially the entire duration of separation of a batch of liquid feed mixture. With knowledge about the heavy phase content in the liquid feed mixture, the control system may be set to control the flow control valve to control the flow of light phase to achieve the desired relationship.

When the batch of liquid feed mixture has an even concentration, e.g. due to the liquid feed mixture coming from a liquid feed mixture container wherein the liquid feed mixture is stirred by a stirring member, only small control adjustments of the flow control valve are foreseen. If the batch of liquid feed mixture has an uneven concentration, the flow control valve may have to be adjusted over a wider range.

In the latter case, the concentration of the liquid feed mixture may vary over at least part of the duration of separation of a batch of liquid feed mixture. Still, with knowledge about the momentary heavy phase content in the liquid feed mixture, the control system may be set to control the flow control valve to control the flow of light phase to achieve the desired relationship.

The measurements from the liquid feed mixture measuring device and the measurements from the light phase measuring device and/or the heavy phase measuring device may be utilised when the control unit controls the flow control valve towards the desired relationship between the flow of liquid feed mixture and the flow of light phase and/or the flow of heavy phase. For instance, a desired flow of light phase or a desired flow of heavy phase may form a setpoint towards which the flow control valve controls the flow of light phase. In this manner, the control unit may control the flow control valve to achieve the desired relationship between the flow of liquid feed mixture and the flow of light phase and/or the flow of heavy phase.

Since due to the mechanically hermetically sealed inlet and outlets of the centrifugal separator, the inlet and outlets form communicating vessels, the heavy phase flow is constituted by the difference in flow between the liquid feed mixture flow and the light phase flow. Accordingly, the heavy phase flow may be indirectly measured by a light phase measuring device, and vice versa, the light phase flow may be indirectly measured by a heavy phase measuring device. The control unit may apply a control algorithm such as a PID control algorithm for controlling the flow control valve.

The desired relationship may be that the desired flow of light phase is a percentage, or within a percentage range, of the flow of liquid feed mixture. Alternatively, the desired relationship may be that the desired flow of heavy phase is a percentage, or within a percentage range, of the flow of liquid feed mixture.

According to some embodiments, the liquid feed mixture measuring device may be a volume flow meter.

According to some embodiments, the liquid feed mixture measuring device may be a mass flow meter. According to alternative embodiments, the centrifugal separation system may comprise a mass flow meter arranged in the liquid feed mixture conduit in addition to the liquid feed mixture measuring device.

According to embodiments of the method, the step of conducting the flow of liquid feed mixture into the separation space may comprise a step of: conducting a flow of liquid feed mixture comprising a cell culture mixture into the separation space. In this manner, the method may be utilised for controlling separation of a cell culture mixture into a heavy phase containing the cells of the cell culture mixture and a light phase substantially free of the cells of the cell culture mixture.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which:

FIGS. 1 and 1*a* illustrate embodiments of a centrifugal separation system, FIG. 2 schematically illustrates a cross section through a portion of a centrifugal separator according to embodiments, FIG. 3 schematically illustrates a cross-section through an exchangeable separation insert according to embodiments, FIG. 4 schematically illustrates a cross section through a centrifugal separator according to embodiments.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
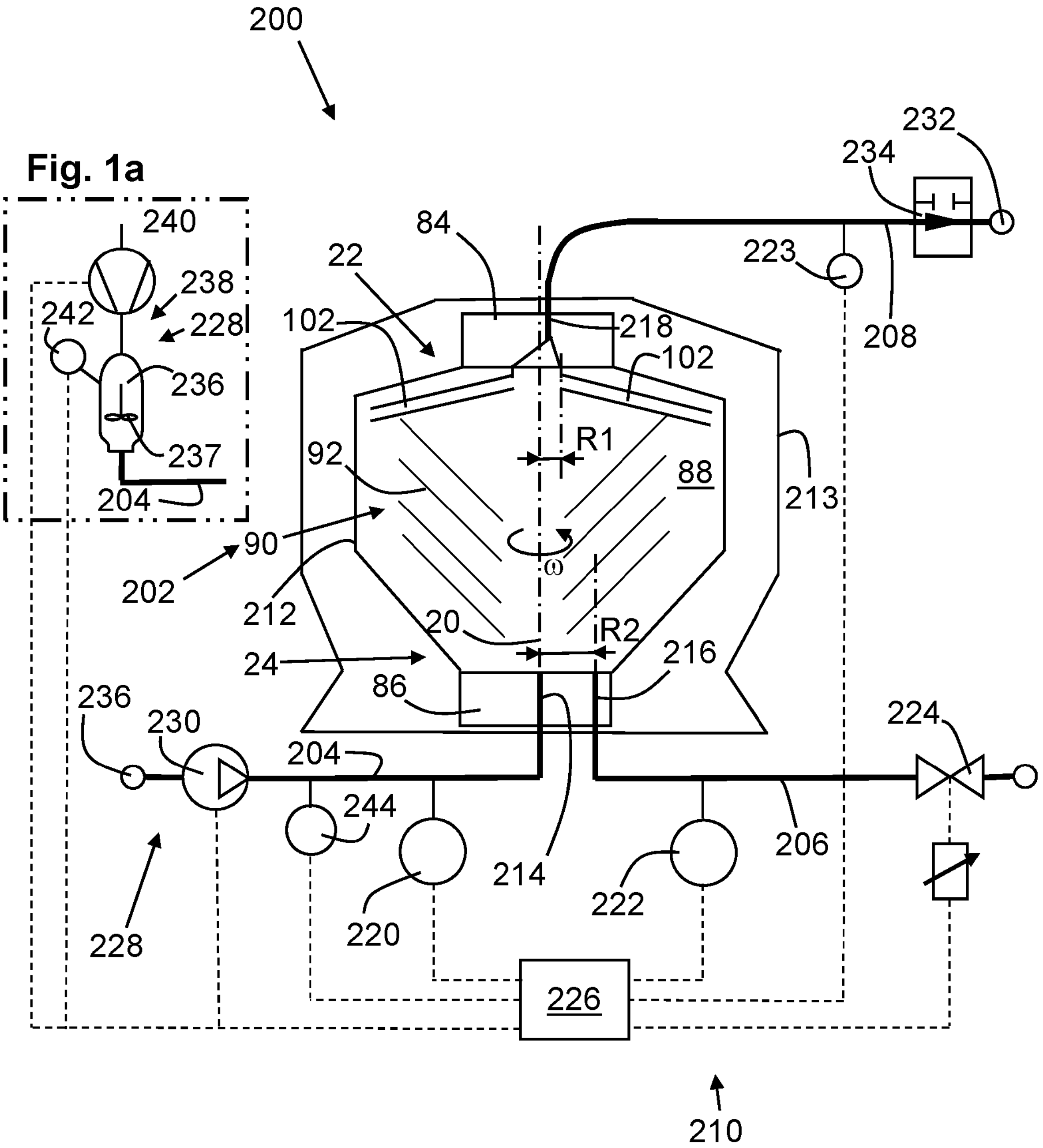

FIGS. 1 and 1*a* schematically illustrate embodiments of a centrifugal separation system 200. Schematically, conduits, components, and a cross sectional view of a centrifugal separator 202 are shown in FIG. 1. FIG. 1*a* shows an alternative embodiment of part of the centrifugal separation system 200.

The centrifugal separation system 200 comprises the centrifugal separator 202, a liquid feed mixture conduit 204, a light phase conduit 206, a heavy phase conduit 208, and a flow control system 210. The centrifugal separator 202 is configured for separating a liquid feed mixture into a light phase and a heavy phase. The liquid feed mixture conduit 204 is configured for conducting the liquid feed mixture to the centrifugal separator 202. The light phase conduit 206 is configured for conducting a separated light phase from the centrifugal separator 202. The heavy phase conduit 208 is configured for conducting a separated heavy phase from the centrifugal separator 202. The flow control system 210 is configured for controlling at least the flows of the light phase and the heavy phase from the centrifugal separator 202. The flow control system 210 may further be configured for controlling the flow of liquid feed mixture to the centrifugal separator 202.

The centrifugal separator 202 comprises a rotor 212 configured to rotate about an axis 20 of rotation. The rotor 212 may be driven to rotate by a drive arrangement (not shown), e.g. comprising an electric motor and a transmission. Thus, the drive arrangement may rotate the rotor 212 about the axis 20 of rotation. The centrifugal separator 202 comprises a first stationary portion 84 arranged at a first axial end 22 of the rotor 212 and a second stationary portion 86 arranged at a second axial end 24 of the rotor 212.

The rotor 212 is rotatably mounted inside a housing 213 of the centrifugal separator 202. Also, the first and second stationary portions 84, 86 are mounted in the housing 213. The first and second stationary portions 84, 86 are stationary in relation to the housing 213. During use of the centrifugal separator 202, the first stationary portion 84 is arranged above the rotor 212 and the second stationary portion 86 is arranged below the rotor 212.

The rotor 212 is provided with a separation space 88. A stack 90 of separation discs 92 is arranged inside the separation space 88.

During separation of the liquid feed mixture in the separation space 88 of the rotor 212, the separated light phase flows radially inwardly between the separation discs 92 towards the axis 20 of rotation, whereas the separated heavy phase flows radially outwardly towards a periphery of the separation space 88.

In the illustrated embodiments, an inlet passage 214 extends into the separation space 88 via the second stationary portion 86. A light phase outlet passage 216 extends from the separation space 88 via the second stationary portion 86. A heavy phase outlet passage 218 extends from the separation space 88 via the first stationary portion 84.

Alternatively, the inlet passage may extend into the separation space 88 via the first stationary portion 84, and/or the light phase outlet passage may extend from the separation space 88 via the first stationary portion 84, and/or the heavy phase outlet passage may extend from the separation space 88 via the second stationary portion 86.

The inlet passage 214 connects to, or forms part of, the liquid feed mixture conduit 204. The light phase outlet passage 216 connects to, or forms part of, the light phase conduit 206. The heavy phase outlet passage 218 connects to, or forms part of, the heavy phase conduit 208.

The light phase outlet passage 206 and the heavy phase outlet passage 208 form the only outlets from the rotor 212. That is, the rotor 212 is not provided with intermittently openable nozzles at a radially outer portion thereof.

The heavy phase outlet passage 218 comprises at least one channel 102 extending within the rotor 212 from a radially outer portion of the separation space 88 towards a central portion of the rotor 212. In the illustrated embodiments, two channels 102 in the form of tubes have been shown as an example. The tubes have substantially the same cross-sectional area at their radially outer end as at their radially inner end. Below, with reference to FIG. 4, alternative embodiments comprising channels in the form of passages are shown.

Each of the inlet passage 214, the light phase outlet passage 216, and the heavy phase outlet passage 218 is mechanically hermetically sealed between the rotor 212 and respective of the first and second stationary portions 84, 86. Mechanically hermetically seals are provided by sealing members (not shown).

In a general embodiment, relationships of the radii of the inlet and outlet passages 214, 216, 218 may be expressed as $R2 \geq R1 \geq R0$ and $R2 > R0$. The inlet passage 214 enters the rotor 212 centrally on the axis 20 of rotation, i.e. at a radius $R0$ including the axis 20 of rotation. Naturally, the inlet passage 214 must have a radial extension, but it includes the axis 20. The heavy phase outlet passage 218 exits the rotor 212 at a first radius R1 The heavy phase outlet passage 218 may also include the axis 20. The light phase outlet passage exits the rotor 212 at a second radius R2. The second radius R2 is larger than or equals R1. The second radius R2 is larger than the radius R0 of the inlet passage 214.

According to some embodiments, relationships of the radii of the inlet and outlet passages 214, 216, 218 may have the relationship R2>R1>R0. The first radius R1 is larger than R0. That is, the radial position of the heavy phase outlet passage 218, where it exits the rotor 212, is arranged outside the radial position of the inlet passage 214 where it enters the rotor 212. The heavy phase outlet passage 218 may also include the axis 20, but in any case, R1 is larger than R0. The light phase outlet passage exits the rotor 212 at the second radius R2. The second radius R2 is larger than the first radius R1.

The inlet passage 214 arranged on the axis 20 of rotation of the rotor 212 provides for a gentle admittance of the liquid feed mixture into the separation space 88 during use of the centrifugal separation system 200. Moreover, the mechanically hermetically sealed inlet passage 214 provides for air free admittance of the liquid feed mixture into the separation space 88. That is, no air-liquid interface is formed in the centre of the separation space 88, and no air will be present within the separation space 88, during use of the centrifugal separator 202. Also this provides for gentle admittance and acceleration of the liquid feed mixture within the separation space 88. Further, since the heavy phase outlet passage 218 exits the rotor 212 at the small first radius R1 in comparison with the exit from the rotor 212 of the light phase outlet passage 216 at the second radius R2, a gentle transition of the separated heavy phase from the rotor 212 to the first stationary portion 84 is provided during use of the centrifugal separator 202. Also the provision of the mechanically hermetically sealed heavy phase outlet passage 218, which thus lacks a paring disc, provides for a gentle outlet of the separated heavy phase from the rotor 212. In all, the centrifugal separator 202 is configured for subjecting the liquid feed mixture and the separated heavy phase to low shear forces. Thus, the centrifugal separator 202 is configured for a gentle handling of the liquid feed mixture and the separated heavy phase.

Mentioned purely as an example, the separation space 88 may have a radius of 50 mm and the separation discs 92 may have a radius of 40 mm. The first radius R1 may be within a range of 3-10 mm. The second radius R2 may be 15 mm. The radius R0 of the inlet passage may be 3 mm.

The flow control system 210 comprises a control unit 226, a flow control valve 224 arranged in the light phase conduit 206, a liquid feed mixture measuring device 220, and a light phase measuring device 222 and/or a heavy phase measuring device 223.

The control unit 226 is configured to control the flow control valve 224 based on measurements from the liquid feed mixture measuring device 220 and measurements from the light phase measuring device 222 and/or the heavy phase measuring device 223. The flow control valve 224 is configured to control of the back pressure provided in the light phase conduit 206. The flow control valve 224 has a control range over which the back pressure, and accordingly the flow, in the light phase conduit 206 may be controlled.

The control unit 226 comprises a calculation unit of the flow control system 210. The calculation unit which may take the form of substantially any suitable type of programmable logical circuit, processor circuit, or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression calculation unit may represent a processing circuitry comprising a plurality of processing circuits, such as, e.g., any, some or all of the ones mentioned above. The control system 210 may comprises a memory unit. The calculation unit is connected to the memory unit, which provides the calculation unit with, for example, stored programme code and/or stored data which the calculation unit needs to enable it to do calculations. The calculation unit may also be adapted to storing partial or final results of calculations in the memory unit. The memory unit may comprise a physical device utilised to store data or programs, i.e., sequences of instructions, on a temporary or permanent basis. The control unit 226 is connected inter alia to the flow control valve 224, the liquid feed mixture measuring device 220, and the light phase measuring device 222 and/or the heavy phase measuring device 223, depending on which are/is present in the separation system 200. Thus, the control unit 226 can receive measurements from the measuring devices 220, 222, 223, and can send control signals to the flow control valve 224.

The present invention is based inter alia around the idea to provide a separation system 200 wherein the separated heavy phase is handled in a gentle manner. Accordingly, the above discussed provision of the comparatively small first radius R1 in the heavy phase outlet passage 218 and the mechanical hermetical sealing of the heavy phase outlet passage 218 in the centrifugal separator 202. Moreover, in the separation system 200, flow restrictions are avoided in the heavy phase conduit 208. Hence, the arrangement of the flow control valve 224 in the light phase conduit 206 which is controlled by the control unit 226. Thus, during operation of the separation system 200, controlling the flow of liquids through the centrifugal separator 202 and at least part of the separation system 200 is achieved by the flow control valve 224 and the control thereof by the control unit 226. Since the inlet and outlets of the centrifugal separator 202 form communicating vessels due to their mechanically hermetically sealing, the flow of separated heavy phase in the heavy phase conduit 208 may be indirectly controlled via the flow control valve 224 arranged in the light phase conduit 206, and no flow controlling restrictions are required in the heavy phase conduit 208.

According to some embodiments, the centrifugal separation system 200 may comprise a heavy phase receiving container 232. The heavy phase conduit 208 extends to the heavy phase receiving container 232. Suitably, the heavy phase conduit 208 forms an unrestricted passage from the centrifugal separator 202 to the heavy phase receiving container 232. That is, when a flow of heavy phase exists from the heavy phase outlet passage 218 to the heavy phase receiving container 232, the passage provided by the heavy phase conduit 208 is unrestricted. Herein the term unrestricted means that the heavy phase conduit 208 has a substantially constant cross-sectional area and is not subjected to any sharp bends. Thus, shear forces in the heavy phase flowing through the heavy phase conduit 208 may be kept to a minimum.

The centrifugal separation system 200 may comprise a shut-off valve 234 arranged in the heavy phase conduit 208. The shut-off valve 234 has only two alternative positions, a fully closed position in which no flow can pass the shut-off valve 234, and a fully open position in which a flow of heavy phase can pass the shut-off valve 234 unrestrictedly. Thus, an unrestricted flow of heavy phase in the heavy phase conduit 208 is provided when the shut-off valve 234 is open.

During start-up pf the centrifugal separation system 200, a flow of liquid feed mixture and/or only partly separated heavy phase through the heavy phase conduit 208 may be prevented by closing the shut-off valve 234. The shut-off valve 234 may be opened once a certain amount of heavy phase has been separated in the centrifugal separator 202.

The liquid feed mixture conduit 204 is connected to a source of pressurised liquid feed mixture 228. During use of the centrifugal separation system 200, the source of pressurised liquid feed mixture 228 is configured to feed the liquid feed mixture into the centrifugal separator 202. The pressure level produced by the source of pressurised liquid feed mixture 228 is such that not only is the liquid feed mixture fed into the centrifugal separator 202 but also for feeding the separated light and heavy phases out of the centrifugal separator 202, via the light phase conduit 206 and the heavy phase conduit 208, respectively.

A balance between the flow of light phase in the light phase conduit 206 and the flow of heavy phase in the heavy phase conduit 208 is set by the flow control valve 224 arranged in the light phase conduit 206.

More specifically, controlling the flow of liquids through the centrifugal separator 202 and at least part of the separation system 200 is achieved by the flow control valve 224 and the control thereof by the control unit 226. Since the inlet and outlets of the centrifugal separator 202 form communicating vessels due to their mechanically hermetically sealing, the flow of separated heavy phase in the heavy phase conduit 208 may be indirectly controlled via the flow control valve 224, and no flow controlling restrictions are required in the heavy phase conduit 208.

By controlling the back pressure produced by the flow control valve 224 in the light phase conduit 206, the flow of light phase in the light phase conduit 206 may be controlled in relation to the flow of liquid feed mixture from the source of pressurised liquid feed mixture 228 in the liquid feed mixture conduit 204 and the flow of heavy phase in the heavy phase conduit 208. The control unit 226 controls the flow control valve 224 to achieve a desired flow of light phase and heavy phase. For instance, measurements from the liquid feed mixture measuring device 220 and measurements from the light phase measuring device 222 are provided to the control unit 226 and form a basis for the control of the flow control valve 224 by the control unit 226.

The source of pressurised liquid feed mixture 228 may take different forms. Two example embodiments are shown in FIGS. 1 and 1*a*.

According to the embodiments shown in FIG. 1, the centrifugal separation system 200 comprises a feed pump 230 arranged in the liquid feed mixture conduit 204. The feed pump 230 forms part of the source of pressurised liquid feed mixture 228. The source of pressurised liquid feed mixture 228 further comprises a liquid feed mixture container 236. The feed pump 230 provides a pressure in the liquid feed mixture coming from the liquid feed mixture container 236 sufficient for feeding the liquid feed mixture into and the separated light and heavy phases out of the centrifugal separator 202, as discussed above. The feed pump 230 is controlled by the control unit 226. Thus, the control unit 226 may control the pressure of the liquid feed mixture being fed into the centrifugal separator 202.

According to the embodiments shown in FIG. 1*a* (the broken line box), the centrifugal separation system 200 comprise a liquid feed mixture container 236 and means 238 for controlling a pressure within the liquid feed mixture container 236. The means 238 for controlling the pressure within the liquid feed mixture container 236 comprises a pressure source such as a compressor 240 and a pressure sensor 242. The pressure sensor 242 is connected to the control unit 226. The control unit 226 is configured to control the compressor 240 based on pressure measurements from the pressure sensor 242. Thus, the control unit 226 may control of the pressure of the liquid feed mixture being fed into the centrifugal separator 202. In these embodiments, the liquid feed mixture container 236 forms part of the source of pressurised liquid feed mixture 228.

In the embodiments of FIG. 1*a*, the liquid feed mixture conduit 204 extends from the liquid feed mixture container 236 to the centrifugal separator at 202. Again, the liquid feed mixture measuring device 220 is connected to the liquid feed mixture conduit 204. No feed pump is required in the liquid feed mixture conduit 204.

A further embodiment of a source of pressurised liquid feed mixture may be a liquid feed mixture container 236 suspended at an elevated position in relation to the centrifugal separator 202.

A stirring member 237 may be arranged within the liquid feed mixture container 236, as indicated in FIG. 1*a*. Thus, by stirring the liquid feed mixture within the liquid feed mixture container 236 with the stirring member 237, an even concentration of the liquid feed mixture within the liquid feed mixture container 238 may be ensured. For instance, during the production of a liquid feed mixture in the form of a cell culture mixture in the liquid feed mixture container 238, an even concentration may be advantageous. Also, during use of the centrifugal separation system 200 for separating the liquid feed mixture, an even concentration may be advantageous for the control of the flow control valve 224 and the flow in the light phase conduit 206, see further below.

A stirring member 237 may be provided in each embodiment comprising a liquid feed mixture container 236.

In the following, control of the separation of the liquid feed mixture into the light phase and the heavy phase in the centrifugal separation system 200 will be discussed with reference to FIGS. 1 and 1*a*.

As mentioned above, the control unit 226 is configured to control the flow control valve 224 based on measurements from the liquid feed mixture measuring device 220 and measurements from the light phase measuring device 222 and/or the heavy phase measuring device 223. Suitably, only one of the light phase and heavy phase measuring devices 222, 223 is provided in the centrifugal separation system 200.

The measurements from the liquid feed measuring device 220 may relate to a flow of liquid feed mixture. The measurements from the light phase measuring device 222 and/or the heavy phase measuring device 223 may relate to a flow of light phase and/or a flow of heavy phase.

The control unit 226 is configured to control the flow control valve 224 towards a desired relationship between a flow of liquid feed mixture and a flow of light phase and/or a flow of heavy phase. The flow of liquid feed mixture is measured by the liquid feed mixture measuring device 220. The flow of light phase is measured by the light phase measuring device 222, if the centrifugal separation system 200 comprises the light phase measuring device 222. The flow of heavy phase is measured by the heavy phase measuring device 223, if the centrifugal separation system 200 comprises the heavy phase measuring device 223.

Alternatively, instead of measuring a particular flow of liquid feed mixture, light phase, or heavy phase, the particular flow may be calculated based on the two other flows. For instance, the flow of heavy phase may be calculated by a difference in flow between the flow of liquid feed mixture and the flow of light phase.

In the desired relationship between the flow of liquid feed mixture and the flow of light phase and/or the flow of heavy phase, according to some embodiments, the flow of liquid feed mixture and the flow of light phase and/or the flow of heavy phase, are volume flows.

Thus, according to some embodiments, the liquid feed mixture measuring device 220 is a volume flow meter.

Also, the light phase measuring device 222 and/or the heavy phase measuring device 223, which ever are/is present in the separation system 200, may be a volume flow meter/s.

The volume flow meters could for instance be ultrasonic type flow meters. Ultrasonic type flow meters do not subject the liquid flowing there through to mechanical stress, such as shear forces. Thus, a gentle passage of the liquid through the volume flow meter is provided.

In the desired relationship between the flow of liquid feed mixture and the flow of light phase and/or the flow of heavy phase, according to some embodiments, the flow of liquid feed mixture and the flow of light phase and/or the flow of heavy phase are mass flows.

According to some embodiments, the liquid feed mixture measuring device 220 is a mass flow meter.

Some types of mass flow meters may also determine a volume flow. Thus, according to some embodiments, both the mass flow and the volume flow of liquid feed mixture in the liquid feed mixture conduit 204 may be determined.

Alternatively, in embodiments wherein the liquid feed mixture measuring device 220 is a volume flow meter, the centrifugal separation system 200 may comprise a mass flow meter 244 arranged in the liquid feed mixture conduit 204. In this manner, both the volume flow and the mass flow of liquid feed mixture in the liquid feed mixture conduit 204 may be determined.

In embodiments wherein the liquid feed mixture measuring device 220 is a mass flow meter or wherein an additional mass flow meter 244, such meters may be provided in the form of e.g. a Coriolis flow meter. Alternatively, a scale may be provided and a weight change over time provides the mass flow. For instance, the scale may be provided in connection with a container such as the liquid feed mixture container 236.

Control of the separation of the liquid feed mixture in the separation system 200 may be performed as follows:

The control unit 226 controls the flow control valve 224 provided in the light phase conduit 206 based on a desired relationship between the flow of liquid feed mixture and the flow of light phase or the flow of heavy phase. The desired relationship is selected by an operator of the centrifugal separation system 200. For instance, the desired relationship may be that the flow of light phase is 90% of the flow of liquid feed mixture. This results in a 90/10 split of the flow of liquid feed mixture between the light phase and the heavy phase. The desired relationship between the flow of liquid feed mixture and the flow of light phase or the flow of heavy phase may be applied to volume flows as well as to mass flows.

In embodiments wherein the liquid feed mixture comprises particles suspended in a liquid, such as a cell culture mixture, a desired concentration of the heavy phase, such as a desired particle content in the heavy phase may be e.g. 70%. A sample of the liquid feed mixture taken from the liquid feed mixture container 236 may show that particle content of the liquid feed mixture is e.g. 7%. Thus, if it is assumed that the centrifugal separator 202 has 100% separation efficiency, i.e. the separated light phase does not contain any particles, the 70% particle content in the heavy phase leads to the calculation:

$$7\%/0.70=10\%$$

That is, in this example the flow of heavy phase being 10% of the flow of liquid feed mixture will have a 70% particle content. Accordingly, the flow of light phase is 90% of the flow of liquid feed mixture, and the control unit 226 is set to control the flow control valve 224 to provide the desired relationship of the flow of light phase being 90% of the flow of liquid feed mixture. Which also corresponds to the desired relationship of the flow of heavy phase being 10% of the flow of liquid feed mixture. The control unit 226 is configured to control the control valve 224 towards the 90/10 split between light and heavy phase flow based on the flow measurements provided by the liquid feed mixture measuring device 220 and the light phase measuring device 222 and/or the heavy phase measuring device 223.

In case of the above example relating to the liquid feed mixture being a cell culture mixture, the particle content would be the Packed Cell Volume, PCV, of the cell culture mixture, and the particle content of the heavy phase could be referred to as the Bio Content of the heavy phase.

The control unit 226 may apply a known control algorithm, such as a PI or PID control algorithm for controlling the flow control valve 224 to maintain the desired relationships between the flow of liquid feed mixture and the flow of light phase or the flow of heavy phase. A desired flow of light phase or a desired flow of heavy phase may form a setpoint in the control unit 226 towards which the control unit 226 controls the flow control valve 224 to achieve the desired relationship between the flow of liquid feed mixture and the flow of light phase and/or the flow of heavy phase.

In case the liquid feed mixture measuring device 220 and the light phase measuring device 222 and/or the heavy phase measuring device 223 are volume flow meters, for the above control approach to work properly, the heavy phase content, such as in this case the particle content, of the liquid feed mixture in the liquid feed mixture conduit 204 should be substantially constant over a main part of the duration of separating a batch of liquid feed mixture from the liquid feed mixture container 236. The provision of the stirring member 237, which stirs the liquid feed mixture while the liquid feed mixture container 236 is gradually emptied, may ensure an even concentration of the liquid feed mixture over at least a main part of the duration of separating a batch of liquid feed mixture. Naturally, the control approach may alternatively be implemented on an even concentration liquid feed mixture using mass flows instead of volume flows.

In embodiments wherein the liquid feed mixture measuring device 220 is a mass flow meter or wherein an additional mass flow meter 244 is provided in the liquid feed mixture conduit 204, a varying mass flow of liquid feed mixture may be taken account of. That is, a flow of liquid feed mixture with a varying heavy phase content may be taken account of. Namely, a mass flow meter not only provides measurements of a mass flow, m', but also a density, ρ, of the liquid feed mixture, and a volume flow, V'. The relationship between these parameters is:

$$m'=\rho(t)*V'$$

Accordingly, the volume flow may be attained also with a mass flow meter. The desired relationship between the flow of liquid feed mixture and the flow of light phase or the flow of heavy phase will have to be adjusted as the density of the liquid feed mixture varies. Thus, based on the density measurements, the control unit 226 will be configured to calculate and update the desired relationship for controlling the flow control valve 224 and control the flow control valve accordingly. For instance, continuing with the example above, wherein a desired particle content in the heavy phase is 70%, the density of the liquid feed mixture may rise to a 10% particle content. This will lead to the calculation:

10%/0.70=14.3%

Accordingly, the volume flow of heavy phase has to increase to 14.3% in order to maintain 70% particle content. Then the volume flow of the light phase is 85.7% of the volume flow of liquid feed mixture, and the control unit 226 is set to control the flow control valve 224 to provide the desired relationship of the volume flow of light phase being 85.7% of the flow of liquid feed mixture. Which also corresponds to the desired relationship of the volume flow of heavy phase being 14.3% of the volume flow of liquid feed mixture.

Thus, the above discussed control approach utilising the desired relationship between the flow of liquid feed mixture and the flow of light phase or the flow of heavy phase, and based on the volume flows in the liquid feed mixture conduit 204 and the light phase conduit 206 and/or the heavy phase conduit 208, may still be utilised. However, with varying density of the feed mixture the desired relationship has to be adjusted correspondingly.

In embodiments wherein mass flow meters are utilised and wherein a gentle treatment of the separated heavy phase is desirable, suitably, no mass flow meter is provided at the heavy phase conduit 208 due to that a mass flow meter may subject the liquid flowing there through to shear forces. Accordingly, in such embodiments the only conduit leading from the centrifugal separator 202 provided with a mass flow meter may be the light phase conduit 206. That is, the light phase measuring device 222 in such case is a mass flow meter.

However, as understood from the discussion above, the flow meter/s on the outlet side of the centrifugal separator may still be a volume flow meter/s when the liquid feed mixture measuring device 220 is a mass flow meter or when an additional mass flow meter 244 is provided in the liquid feed mixture conduit 204.

Figure 2:
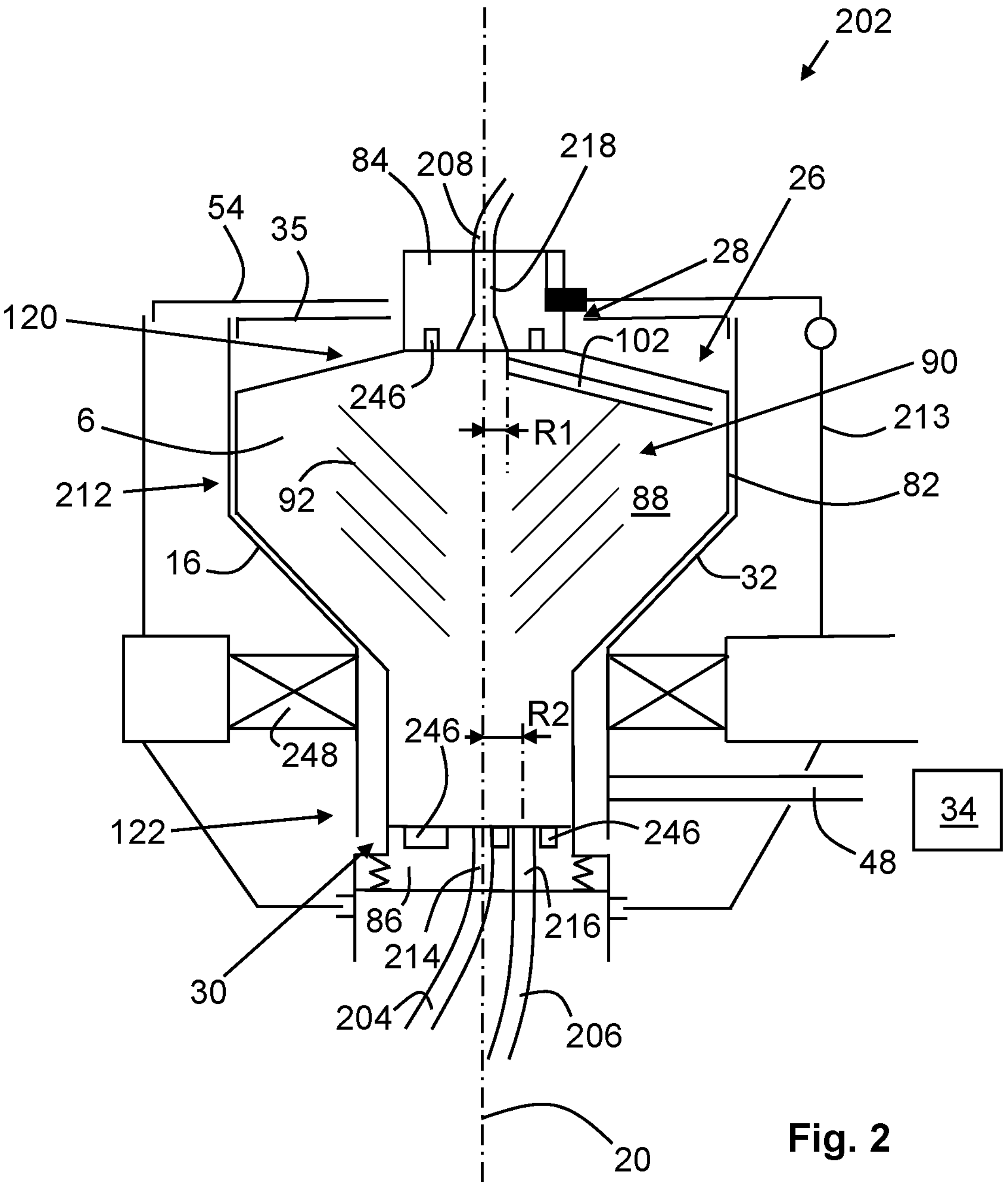

FIG. 2 schematically illustrates a cross section through a portion of a centrifugal separator 202 according to embodiments. The centrifugal separator 202 may be utilised in a centrifugal separation system 200 as discussed above with reference to FIG. 1.

Again, the centrifugal separator 202 comprises a rotor 212 provided with a separation space 88, a stack 90 of separation discs 92 arranged inside the separation space 88, a first stationary portion 84, and a second stationary portion 86. An inlet passage 214 extends into the separation space 88 via the second stationary portion 86, a light phase outlet passage 216 extends from the separation space 88 via the second stationary portion 86, a heavy phase outlet passage 218 extends from the separation space 88 via the first stationary portion 84.

Again, the heavy phase outlet passage 218 comprises at least one channel 102 extending within the rotor 212 from a radially outer portion of the separation space 88 towards a central portion of the rotor 212. In these embodiments, one channel 102 in the form of a tube is provided.

Again, each of the inlet passage 214, the light phase outlet passage 216, and the heavy phase outlet passage 218 is mechanically hermetically sealed between the rotor 212 and respective of the first and second stationary portions 84, 86. Mechanical hermetical seals of the inlet passage 214 and the outlet passages 216, 218 are provided by sealing members 246. The sealing members 246 comprise rotating parts arranged in the rotor 212 and stationary parts arranged in the first and second stationary portions 84, 86.

Again, the inlet passage 214 enters the rotor 212 centrally on the axis 20 of rotation at R0, the heavy phase outlet passage 218 exits the rotor 212 at a first radius R1, and the light phase outlet passage exits the rotor 212 at a second radius R2, wherein R2≥R1>R0.

The rotor 212 is rotatably mounted inside a housing 213 of the centrifugal separator 202. The rotor 212 is journaled in a bearing 248. A drive arrangement comprising an electric motor 34 and a transmission 48 is configured to rotate the rotor 212 about the axis 20 of rotation.

In these embodiments, the centrifugal separator 202 is a modular centrifugal separator 202. The modular centrifugal separator 202 comprise two main parts, a base unit 4 and an exchangeable separation insert 6. The base unit 4 comprise basic components for supporting and rotating the exchangeable separation insert 6. The exchangeable separation insert 6 is configured for the actual separation of the liquid feed mixture to take place therein.

The exchangeable insert 6 comprises a rotor casing 82, and the first and second stationary portions 84, 86 arranged at respective axial ends 120, 122 of the rotor casing 82. The rotor casing 82 comprises therein the separation space 88, the separation discs 92, and the at least one channel 102.

The exchangeable separation insert 6 is further discussed below with reference to FIG. 3.

The rotor 212 comprises a rotatable member 16 and the rotor casing 82 of the exchangeable separation insert 6.

In FIG. 2 the exchangeable separation insert 6 is shown mounted in the base unit 4. The rotor casing 82 of the exchangeable separation insert 6 is engaged in an inner space 26 of the rotatable member 16. The first stationary portion 84 of the exchangeable separation insert 6 extents through a first opening 28 of the rotatable member 16 and the second stationary portion 86 of the exchangeable separation insert 6 extents through a second opening 30 of the rotatable member 16.

The rotor casing 82 may be engaged inside the rotatable member 16 in a number of different ways. For instance, the rotatable member 16 may comprise a cap 35 and a rotor body 32. When the cap 35 is engaged with the rotor body 32, it engages the rotor casing 82 therein. An inside of the rotatable member 16 may be provided with protrusions and the rotor casing 82 may be provided with corresponding recesses, etc.

At least part of the first stationary portion 84 is arranged outside the rotor 212. Accordingly, the first stationary portion 84 may be engaged with the housing 213 to ensure that the first stationary portion 84 remains stationary during operation of the modular centrifugal separator 2.

At least part of the second stationary portion 86 is arranged outside the rotor 212. Accordingly, the second stationary portion 86 may be engaged with the housing 213 or another part of the base unit 4 to ensure that the second stationary portion 86 remains stationary during operation of the modular centrifugal separator 2.

The housing 213 comprises a lid 54.

Access to the inner space 26 of the rotatable member 16 for placing an exchangeable separation insert 6 therein, or for replacing an exchangeable separation insert 6 therein, is gained by opening the lid 54 of the housing 213 and opening the cap 35 of the rotatable member 16.

The first and second openings 28, 30 of the rotatable member 16 and corresponding openings in the housing 213 provide for easy mounting of the exchangeable separation insert 6 in the rotatable member 16 with conduits 204, 206, 208 leading to the inlet passage 214, the light phase outlet passage 216, and the heavy phase outlet passage 218.

Due to the use of the modular centrifugal separator 202 with the exchangeable separation insert 6, separation of the liquid feed mixture in the centrifugal separator 202 is adapted for separation of a single batch of liquid feed mixture or a limited number of batches of liquid feed mixture. After separation of the batch or batches of liquid feed mixture, the used exchangeable separation insert is exchanged with a new exchangeable separation insert 6.

Utilising the modular centrifugal separator 202 with exchangeable separation inserts 6 provides for a sterile interior, i.e. a sterile flow path within the centrifugal separator 202.

Suitably, in the separation system 200 also other exchangeable components may be utilised to provide a sterile flow path for the liquid feed mixture and the separated light and heavy phases, see FIG. 1. Mentioned purely as examples, the liquid feed mixture container 236, the liquid feed mixture conduit 204, the light phase conduit 206, the heavy phase conduit 208, and the heavy phase receiving container 232 may be exchangeable components to be used for separation of a single batch of liquid feed mixture or a limited number of batches of liquid feed mixture.

Figure 3:
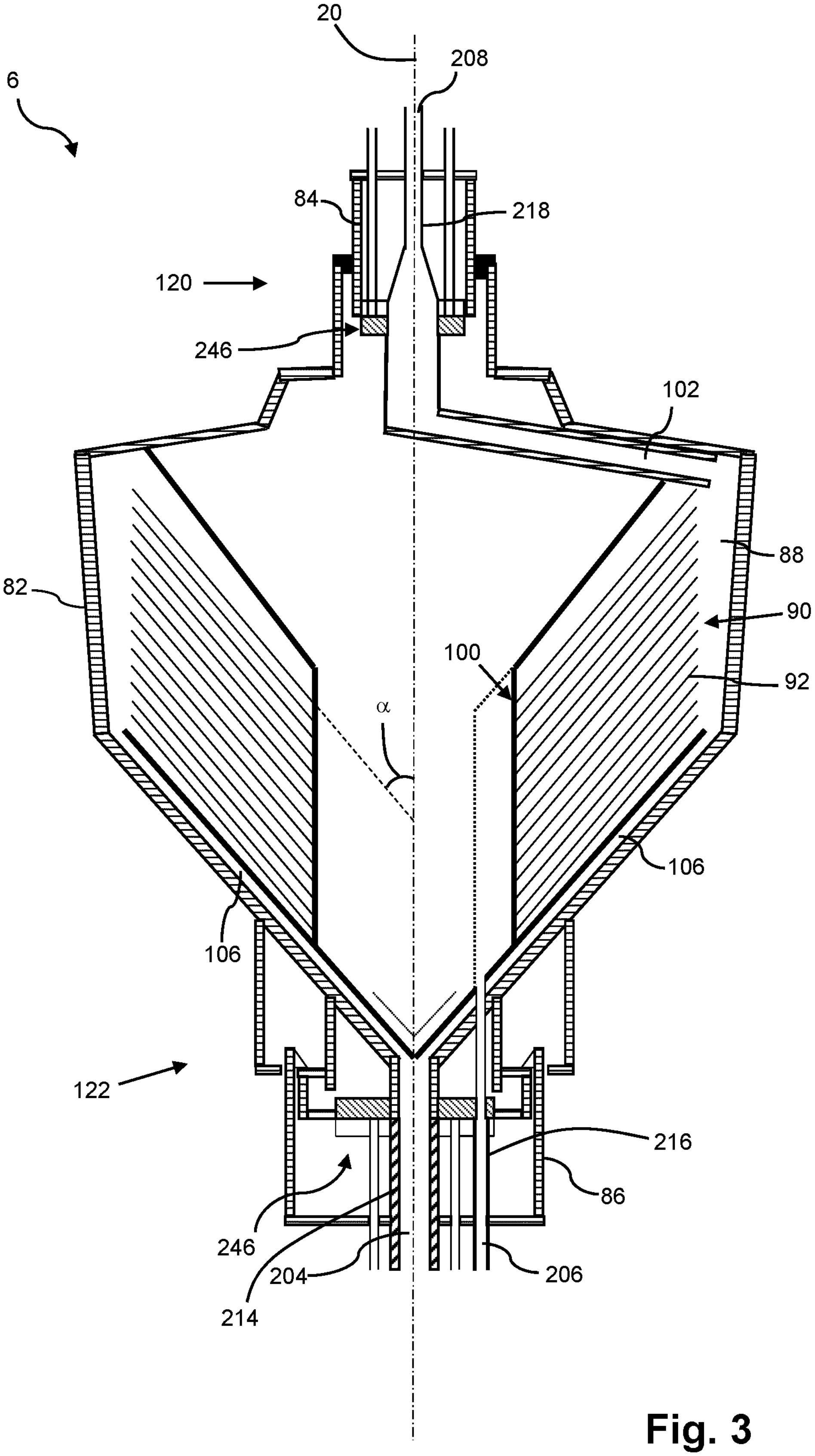

FIG. 3 schematically illustrates a cross-section through an exchangeable separation insert 6 according to embodiments. The exchangeable separation insert 6 may form part of a modular centrifugal separator, such as the modular centrifugal separator 202 discussed above in connection with FIG. 2.

The exchangeable separation insert 6 comprises a rotor casing 82, a first stationary portion 84 and a second stationary portion 86. The rotor casing 82 is rotatable about an axis 20 of rotation. The rotor casing 82 has a first axial end portion 120 and a second axial end portion 122. The rotor casing 82 is arranged between the first stationary portion 86 and the second stationary portion 84. During operation of the modular centrifugal separator, the first stationary portion 84 is arranged at an upper axial end of the exchangeable separation insert 6, whereas the second stationary portion 86 is arranged at a lower axial end of the exchangeable separation insert 6.

The rotor casing 82 delimits a separation space 88 therein. The exchangeable separation insert 6 comprises a stack 90 of frustoconical separation discs 92 arranged in the separation space 88. The separation discs 92 in the stack 90 are arranged with an imaginary apex at the second stationary portion 86, and/or pointing towards the second stationary portion 86. The stack 90 may comprise at least 25 separation discs 92, or at least 50 separation discs 92, such as at least 100 separation discs 92, such as at least 150 separation discs 92. Mentioned as an example, a separation disc 92 may have an outer diameter within a range of 100-400 mm, an inner diameter within a range of 15-100 mm, and an angle $\alpha$ between the axis 20 of rotation and an inner surface of the disc 92 within a range of 35-40 degrees. For clarity reasons, only a few discs 92 are shown in FIG. 3.

An inlet passage 214 extends into the separation space 88 via the second stationary portion 86, a light phase outlet passage 216 extends from the separation space 88 via the second stationary portion 86, and a heavy phase outlet passage 218 extends from the separation space 88 via the first stationary portion 84.

The inlet passage 214 enters the rotor 212 centrally on the axis 20 of rotation at R0, the heavy phase outlet passage 218 exits the rotor 212 at a first radius R1, and the light phase outlet passage exits the rotor 212 at a second radius R2, wherein $R2 \geq R1 > R0$.

The inlet passage 214 connects to, or forms part of, a liquid feed mixture conduit 204. The light phase outlet passage 216 connects to, or forms part of, a light phase conduit 206. The heavy phase outlet passage 218 connects to, or forms part of, a heavy phase conduit 208. The liquid feed mixture conduit 204, the light phase conduit 206 and the heavy phase conduit 208 may form part of the exchangeable separation insert 6. Thus, with each new exchangeable separation insert 6 being installed in the centrifugal separator 2 of the centrifugal separation system 200, see FIG. 1, also at least part of the liquid feed mixture conduit 204, the light phase conduit 206 and the heavy phase conduit 208 are replaced.

The liquid feed mixture conduit 204, the light phase conduit 206 and the heavy phase conduit 208 may comprise tubing, such as plastic tubing.

The heavy phase outlet passage 218 comprises at least one channel 102 extending within the rotor 212 from a radially outer portion of the separation space 88 towards a central portion of the rotor 212. In these embodiments, one channel 102 in the form of a tube is provided.

Such one or more channels 102 in the form of one or more tubes, depending on the number of tubes and e.g. the density and/or viscosity of the heavy phase, may each have an inner diameter within a range of 2-10 mm. In embodiments comprising more than one tube there may be provided e.g. two tubes, or at least three or at least five tubes, evenly distributed over the circumference of the rotor casing 82.

The first stationary portion 84 abuts against the rotor casing 82 at the first axial end portion 120. The second stationary portion 86 abuts against the rotor casing 82 at the second axial end portion 122. Mechanical hermetical seals 246 are provided between the respective first and second stationary portions 84, 86 and the rotor casing 82. Each of the seals 246 comprises rotating sealing surfaces forming part of the rotor casing 82 and stationary sealing surfaces forming part of the stationary portions 86, 84. At the seals, the first and second stationary portions 86, 84, respectively, abut against the rotor casing 82.

The mechanical hermetical seals 246 seal the inlet passage 214, the light phase outlet passage 216, and the heavy phase outlet passage 218 in their respective transitions between the rotor casing 82 and the first and second stationary portions 84, 86.

The seals 246 may be provided with fluid inlets 109 and fluid outlets 111 for supplying and withdrawing a fluid, such as a cooling liquid. Thus, the seals 246 may be cooled. In FIG. 3, one fluid inlet 109 and one fluid outlet 111 is shown at each seals 246. However, further fluid inlets and outlets may be provided.

Figure 4:
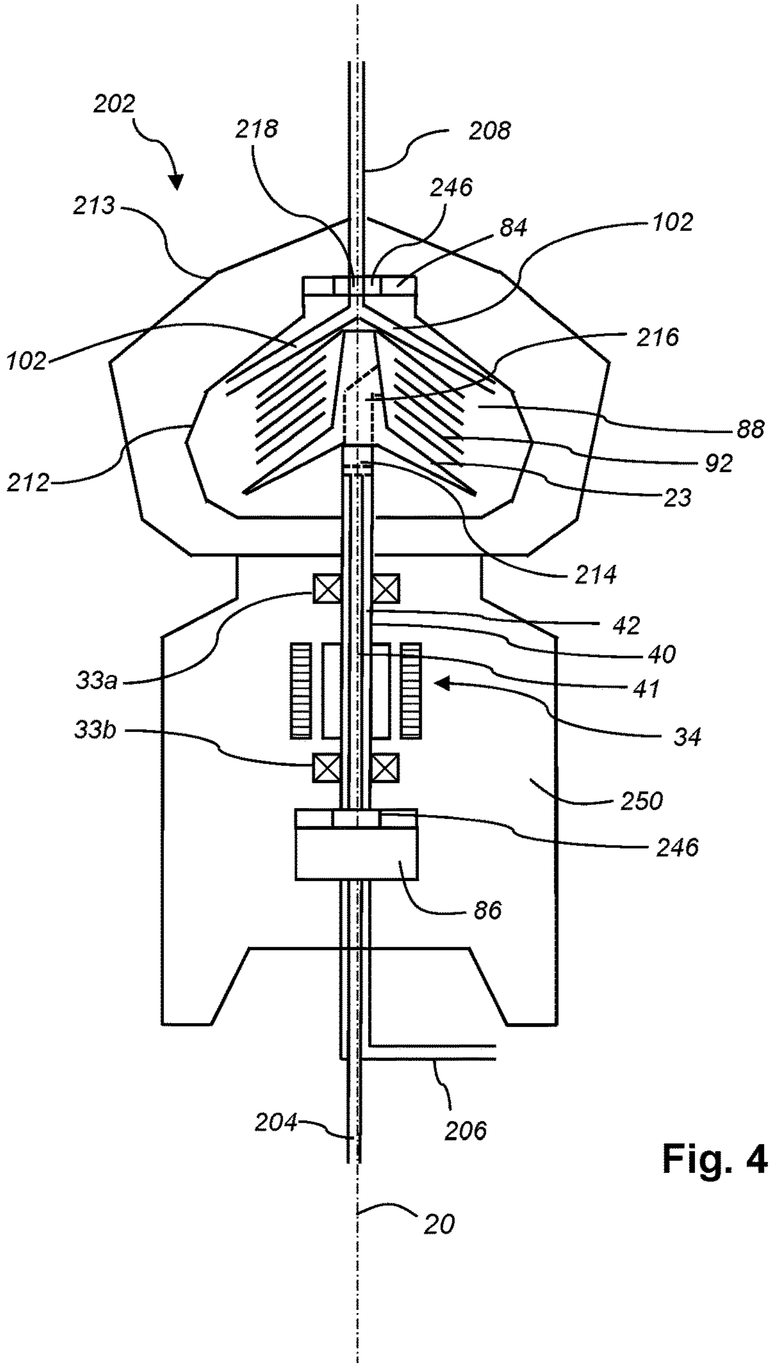

FIG. 4 schematically illustrates a cross section through a centrifugal separator 202 according to embodiments. The centrifugal separator 202 may be utilised in a centrifugal separation system 200 as discussed above with reference to FIG. 1.

Again, the centrifugal separator 202 comprises a rotor 212 provided with a separation space 88, a stack of separation discs 92 arranged inside the separation space 88, a first stationary portion 84, and a second stationary portion 86. In FIG. 4, only a few separation discs 92 are shown. The stack may for example contain more than 100 separation discs 92, such as more than 200 separation discs 92.

Again, an inlet passage 214 extends into the separation space 88 via the second stationary portion 86, a light phase outlet passage 216 extends from the separation space 88 via the second stationary portion 86, a heavy phase outlet passage 218 extends from the separation space 88 via the first stationary portion 84.

Again, the heavy phase outlet passage 218 comprises at least one channel 102 extending within the rotor 212 from a radially outer portion of the separation space 88 towards a central portion of the rotor 212. In these embodiments, the at least one channel 102 is formed by a number of passages having a larger cross sectional area at the radially outer portion than towards the central portion of the separation space 88.

Again, each of the inlet passage 214, the light phase outlet passage 216, and the heavy phase outlet passage 218 is mechanically hermetically sealed between the rotor 212 and respective of the first and second stationary portions 84, 86. Mechanical hermetical seals of the inlet passage 214 and the outlet passages 216, 218 are provided by sealing members 246. The sealing members 246 comprise rotating parts arranged in the rotor 212 and stationary parts arranged in the first and second stationary portions 84, 86.

Again, the inlet passage 214 enters the rotor 212 centrally on the axis 20 of rotation at R0, the heavy phase outlet passage 218 exits the rotor 212 at a first radius R1, and the light phase outlet passage exits the rotor 212 at a second radius R2, wherein R2≥R1>R0.

The centrifugal separator 202 comprises a frame 250, a hollow spindle 40, which is rotatably supported by the frame 250 in a bottom bearing 33*b* and a top bearing 33*a*. The rotor 212 is adjoined to the axially upper end of the spindle 40 to rotate together with the spindle 40 around the axis 20 of rotation. A housing 213 of the frame 250 encloses the rotor 212.

The liquid feed mixture to be separated is admitted into the separation space 88 via a distributor 23. The inlet passage 218 comprises in these embodiments a central duct 41 extending through the spindle 40, which thus takes the form of a hollow, tubular member. Thus, the liquid feed mixture is introduced into the rotor 212 from the bottom of the rotor 212. The spindle 40 is further connected to a stationary liquid feed mixture conduit 204 at a lower axial end of the centrifugal separator 202 via one of the hermetic seals 246, such that the liquid feed mixture to be separated may be transported to the central duct 41, e.g. by means of a feed pump. The separated light phase is in these embodiments discharged via an outer annular duct 42 in the spindle 40.

The mechanical hermetic seal 246 arranged at the lower axial seals the hollow spindle 40 against the second stationary portion 86. The hermetic seal 246 comprises a portion arranged at the bottom end of the spindle 40 and a portion arranged at the second stationary portion 86. This hermetic seal 246 is a concentric double seal that seals both the central duct 41 to the liquid feed mixture conduit 204 and the outer annular duct 42 to a light phase conduit 206. The other mechanical hermetic seal 246 seals the heavy phase outlet 22 at the first stationary portion 84 to a heavy phase conduit 208.

The centrifugal separator 202 comprises a drive arrangement comprising an electric motor 34. The electric motor 34 may for example comprise a stationary element and a rotatable element, which rotatable element surrounds and is connected to the spindle 40 such that it transmits driving torque to the spindle 40 and hence to the rotor 212 during operation. Alternatively, the centrifugal separator 202 may comprise a drive arrangement comprising an electric motor connected to the spindle 40 via transmission means. The transmission means may be in the form of a worm gear which comprises a pinion and an element connected to the spindle 40 in order to receive driving torque. The transmission means may alternatively take the form of a propeller shaft, drive belts or the like, and the electric motor may alternatively be connected directly to the spindle 40.

Figure 5:
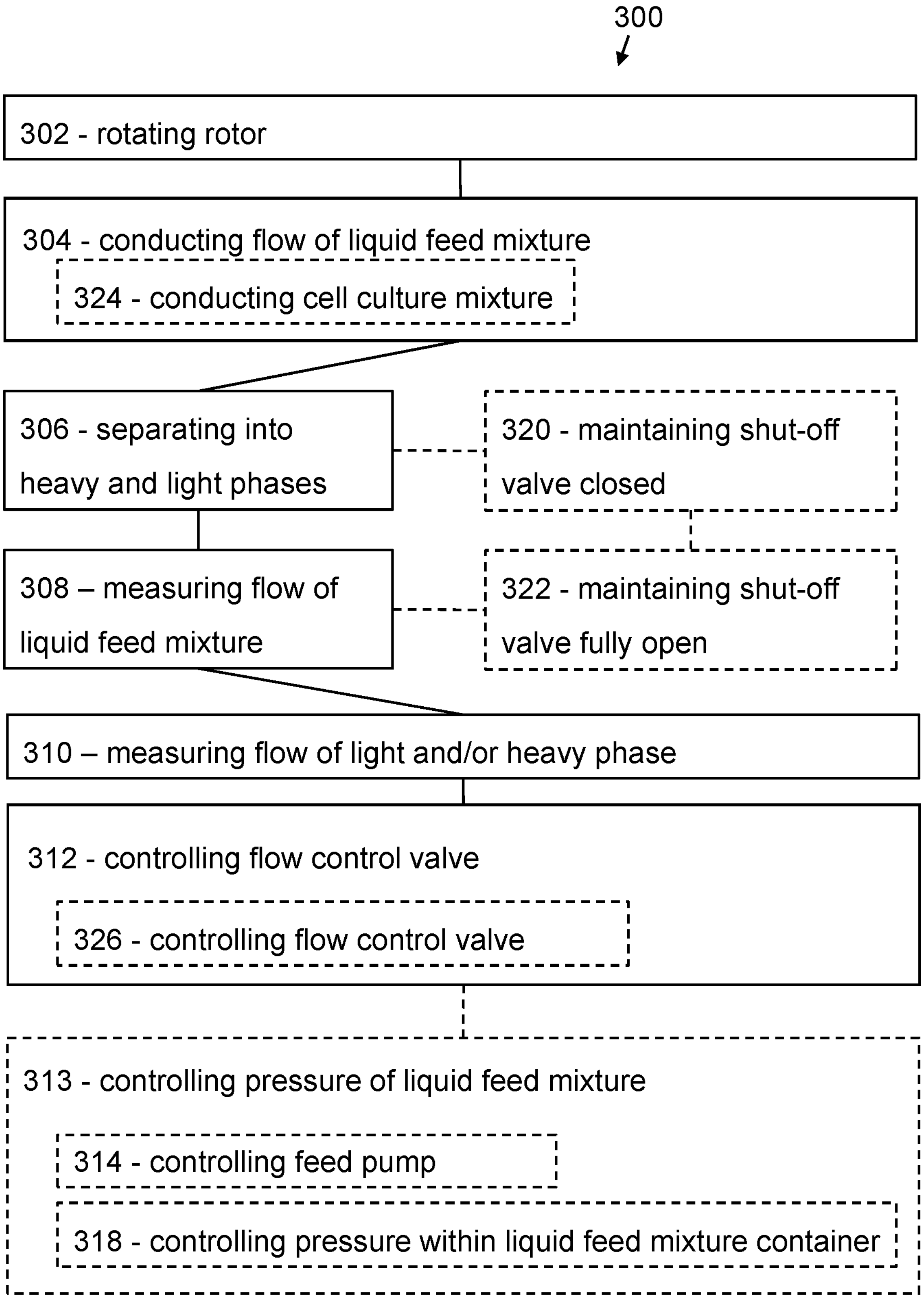
FIG. 5 illustrates a method of controlling a centrifugal separation system according to embodiments.

FIG. 5 illustrates a method 300 of controlling a centrifugal separation system according to embodiments. The centrifugal separation system may be a centrifugal separation system 200 according to any one of aspects and/or embodiments discussed herein. Thus, in the following reference is also made to FIGS. 1-4.

As discussed above, the centrifugal separation system 200 comprising a centrifugal separator 202, a liquid feed mixture conduit 204, a light phase conduit 206, a heavy phase conduit 208, and a flow control system 210. The centrifugal separator 202 comprises a rotor 212 configured to rotate about an axis 20 of rotation and is provided with a separation space 88. An inlet passage 214 extends into the separation space 88 via the first or second stationary portion 84, 86, a light phase outlet passage 216 extends from the separation space 88 via the first or second stationary portion 84, 86, a heavy phase outlet passage 218 extends from the separation space 88 via the first or second stationary portion 84, 86. Each of the inlet passage 214, the light phase outlet passage 216, and the heavy phase outlet passage 218 is mechanically hermetically sealed between the rotor 212 and respective of the first and second stationary portions 84, 86. The inlet passage 214 enters the rotor 212 centrally on the axis 20 of rotation at R0, the heavy phase outlet passage 218 exits the rotor 212 at a first radius R1, and the light phase outlet passage exits the rotor 212 at a second radius R2, wherein R2≥R1>R0. The flow control system 210 comprises a flow control valve 224 arranged in the light phase conduit 206, a liquid feed mixture measuring device 220, and a light phase measuring device 222 and/or a heavy phase measuring device 223.

The method 300 comprises steps of:

- rotating 302 the rotor 212,
- conducting 304 a flow of liquid feed mixture into the separation space 88 via the liquid feed mixture conduit 204 and the inlet passage 214,
- separating 306 the liquid feed mixture into a heavy phase and a light phase in the separation space 88,
- measuring 308 the flow of liquid feed mixture,
- measuring 310 a flow of light phase and/or a flow of heavy phase, and
- controlling 312 the flow control valve 224 based on measurements acquired in the step of measuring 308 the flow of liquid feed mixture and measurements acquired in the step of measuring 310 the flow of light phase and/or the flow of heavy phase.

Similar to previous discussions herein, the mechanical hermetical seals, the particular arrangement of the radii R0, R1, and R2, wherein R2≥R1>R0, and the controlling 312 of the flow control valve 224 based on measurements acquired in the steps of measuring 308 and 310, provide a method 300 of controlling a centrifugal separation system 200 wherein conditions are provided for the heavy phase to be subjected to a gentle treatment.

Suitably, the steps of measuring 308 the flow of liquid feed mixture, measuring 310 a flow of light phase and/or a flow of heavy phase, and controlling 312 the flow control valve 224 are performed over substantially the entire period of separating a batch of liquid feed mixture.

According to embodiments, the method 300 may comprise a step of:

controlling 313 a pressure of the liquid feed mixture. In this manner, feeding of the liquid feed mixture to the centrifugal separator 202 may be controlled. The above discussed step of measuring 308 the flow of liquid feed mixture together with the step of measuring 310 will still provide the basis for controlling 312 the flow control valve 224.

According to embodiments, the step of controlling 313 the pressure of the liquid feed mixture may comprise a step of:

controlling 314 a feed pump 230 arranged in the liquid feed mixture conduit 204. In this manner, feeding of the liquid feed mixture to the centrifugal separator 202 may be controlled by means of pressure provided by the feed pump 230. The above discussed step of measuring 308 the flow of liquid feed mixture together with the step of measuring 310 will still provide the basis for the step of controlling 312 the flow control valve 224.

According to embodiments, wherein the centrifugal separation system 200 comprises a liquid feed mixture container 236, the step of controlling 313 the pressure of the liquid feed mixture may comprise a step of:

controlling 318 a pressure within the liquid feed mixture container 236. In this manner, feeding of the liquid feed mixture to the centrifugal separator 202 may be controlled by means of a pressure inside the liquid feed mixture container 236. The above discussed step of measuring 308 the flow of liquid feed mixture together with the step of measuring 310 will still provide the basis for the step of controlling 312 the flow control valve 224.

According to embodiments of the method 300, wherein the centrifugal separation system 200 comprises a shut-off valve 234 arranged in the heavy phase conduit 208, the method 300 may comprise steps of:

maintaining 320 the shut-off valve 234 closed during an initial separation phase of separating a batch of liquid feed mixture while an interface between the light phase and heavy phase forms within the separation space 88, and maintaining 322 the shut-off valve 234 fully open during a main separation phase of separating the batch of liquid feed mixture when the interface has formed.

Thus, a certain amount of heavy phase may be separated within the separation space 88 before the shut-off valve 234 is opened. Accordingly, a flow through the heavy phase conduit 208 is not started until heavy phase has been separated within the separation space 88.

For instance, the steps of maintaining 320 the shut-off valve 234 closed and maintaining 322 the shut-off valve 234 fully open may be performed while the step of separating 306 is started up and before the step of measuring 308. Thus, the controlling of the flow control valve 224, i.e. the step of controlling 312, may be started first after the shut-off valve 234 has been opened.

The initial separation phase of separating a batch of liquid feed mixture while an interface between the light phase and heavy phase forms, takes place at the start of separating the batch of liquid feed mixture. A certain amount of liquid feed mixture must have had time to flow into the separation space 88 and had time to separate into the light phase and the heavy phase before separated heavy phase exit available for flow through the heavy phase conduit 208. The main separation phase of separating the batch of liquid feed mixture when the interface has formed, takes place after the initial separation phase. Suitably, during the main separation phase, a steady state between the liquid feed mixture conducted into the separation space 88 and the flow of separated light phase and heavy phase prevails. The step of controlling 312 the flow control valve 224 ensures a balance between the flows of separated light and heavy phases in relation to the flow of liquid feed mixture into the separation space 88.

The method 300 of controlling the centrifugal separation system 200 may be utilised for controlling a separation of a liquid feed mixture in the form of a cell culture mixture into a heavy phase containing the cells from the cell culture mixture and a light phase containing a main part of a liquid of the cell culture mixture. Accordingly, the step of conducting 304 the flow of liquid feed mixture into the separation space 88 may comprise a step of: conducting 324 a flow of liquid feed mixture comprising a cell culture mixture.

The step of controlling 312 the flow control valve 224 may comprise a step of:

controlling 326 the flow control valve 224 towards a desired relationship between the flow of liquid feed mixture and the flow of light phase and/or the flow of heavy phase.

Different aspects of the controlling the flow control valve 224 towards the desired relationship between the flow of liquid feed mixture and the flow of light phase and/or the flow of heavy phase have been discussed above, inter alia with reference to FIG. 1.

According to embodiments of the method 300, the flow of liquid feed mixture and the flow of light phase and/or the flow of heavy phase may be volume flows.

According to alternative embodiments of the method 300, the flow of liquid feed mixture and the flow of light phase and/or the flow of heavy phase may be mass flows.

One skilled in the art will appreciate that the method 300 of controlling a centrifugal separation system 200 may be implemented by programmed instructions. These programmed instructions are typically constituted by a computer program comprising instructions, which, when executed in a computer or control unit, ensures that the computer or control unit carries out the desired control, such as the method steps 302-326. The control unit may be a control unit 226 as discussed herein. The computer program is usually part of a computer programme product 90 which comprises a suitable digital storage medium on which the computer program is stored.

Figure 6:
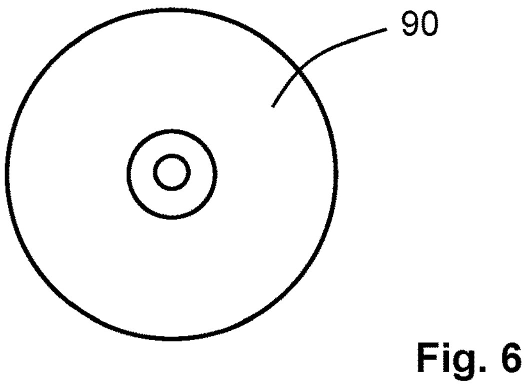
FIG. 6 illustrates a computer-readable storage medium according to embodiments.

FIG. 6 illustrates a computer-readable storage medium 90 according to embodiments. In these embodiments, the computer-readable storage medium 90 is provided in the form of a CD-ROM disc.

The computer-readable storage medium may be provided in any suitable form of a data carrier carrying computer program code for causing at least some of the steps 302-326 of the above discussed method 300 to be carried out when being loaded into the one or more calculation units of a computer and/or control unit. The data carrier may be, e.g. a ROM (read-only memory), a PROM (programable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disc or tape that may hold machine readable data in a non-transitory manner. The computer-readable storage medium may furthermore be provided as computer program code on a server and may be downloaded to a computer and/or a control unit remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A centrifugal separation system comprising:

a centrifugal separator, a liquid feed mixture conduit, a light phase conduit, a heavy phase conduit, and a flow control system, wherein the centrifugal separator comprises a rotor configured to rotate about an axis of rotation and being provided with a separation space, a stack of separation discs arranged inside the separation space, a first stationary portion arranged at a first axial end of the rotor, a second stationary portion arranged at a second axial end of the rotor, wherein an inlet passage extends into the separation space via the first or second stationary portion, a light phase outlet passage extends from the separation space via the first or second stationary portion, a heavy phase outlet passage extends from the separation space via the first or second stationary portion, wherein the heavy phase outlet passage comprises at least one channel extending within the rotor from a radially outer portion of the separation space towards a central portion of the rotor, wherein each of the inlet passage, the light phase outlet passage, and the heavy phase outlet passage is mechanically hermetically sealed between the rotor and respective of the first and second stationary portions, wherein the inlet passage enters the rotor centrally on the axis of rotation at R0, the heavy phase outlet passage exits the rotor at a first radius R1, and the light phase outlet passage exits the rotor at a second radius R2, wherein R2≥R1≥R0 and R2>R0, wherein the flow control system comprises a controller, a flow control valve arranged in the light phase conduit, a liquid feed mixture measuring device, and a light phase measuring device and/or a heavy phase measuring device, wherein the controller is configured to control the flow control valve based on measurements from the liquid feed mixture measuring device and measurements from the light phase measuring device and/or the heavy phase measuring device, wherein the heavy phase conduit is configured to extend to a heavy phase receiving container, wherein the heavy phase conduit forms an unrestricted passage from the centrifugal separator to the heavy phase receiving container when a flow of heavy phase exits from the heavy phase outlet passage to the heavy phase receiving container, wherein the inlet passage enters the first axial end of the rotor parallel and centrally on the axis of rotation, and the light phase outlet passage enters the first axial end of the rotor parallel and offset from the axis of rotation and being separated from the inlet passage, and wherein the heavy phase outlet passage enters the second axial end of the rotor parallel and centrally on the axis of rotation.

2. The centrifugal separation system according to claim 1, wherein the liquid feed mixture conduit is configured to be connected to a source of pressurised liquid feed mixture.

3. The centrifugal separation system according to claim 1, comprising a feed pump arranged in the liquid feed mixture conduit.

4. The centrifugal separation system according to claim 1, comprising a liquid feed mixture container and means for controlling a pressure within the liquid feed mixture container.

5. The centrifugal separation system according to claim 1, comprising a shut-off valve arranged in the heavy phase conduit.

6. The centrifugal separation system according to claim 1, wherein the centrifugal separator comprises an exchangeable separation insert, and wherein the exchangeable insert comprises a rotor casing, and the first and second stationary portions are arranged at respective axial ends of the rotor casing, wherein the rotor casing forms part of the rotor of the centrifugal separator and comprises the separation space, the separation discs, and the at least one channel.

7. The centrifugal separation system according to claim 6, wherein the rotor comprises a rotatable member and the rotor casing, and wherein the rotor casing is engaged in an inner space of the rotatable member.

8. The centrifugal separation system according to claim 1, comprising a liquid feed mixture container, wherein a stirring member is arranged within the liquid feed mixture container.

9. The centrifugal separation system according to claim 1, wherein the measurements from the liquid feed measuring device relate to a flow of liquid feed mixture, the measurements from the light phase measuring device and/or the heavy phase measuring device relate to a flow of light phase and/or a flow of heavy phase, wherein the controller is configured to control the flow control valve towards a desired relationship between the flow of liquid feed mixture and the flow of light phase and/or the flow of heavy phase.

10. The centrifugal separation system according to claim 9, wherein the flow of liquid feed mixture and the flow of light phase and/or the flow of heavy phase are volume flows.

11. The centrifugal separation system according to claim 9, wherein the flow of liquid feed mixture and the flow of light phase and/or the flow of heavy phase are mass flows.

12. The centrifugal separation system according to claim 1, wherein the liquid feed mixture measuring device is a volume flow meter.

13. The centrifugal separation system according to claim 12, comprising a mass flow meter arranged in the liquid feed mixture conduit.

14. The centrifugal separation system according to claim 1, wherein the liquid feed mixture measuring device is a mass flow meter.

15. The centrifugal separation system according to claim 1, wherein the liquid feed mixture measuring device measures the particle content of the liquid feed mixture, and wherein the controller is configured to control the flow control valve based on the particle content of the liquid feed mixture and a target particle content of the heavy phase to set a ratio between flow in the light phase outlet passage and flow in the heavy phase outlet passage.

16. A method of controlling a centrifugal separation system, the centrifugal separation system comprising a centrifugal separator, a liquid feed mixture conduit, a light phase conduit, a heavy phase conduit, and a flow control system, wherein the centrifugal separator comprises a rotor configured to rotate about an axis of rotation and being provided with a separation space, a stack of separation discs arranged inside the separation space, a first stationary portion arranged at a first axial end of the rotor, a second stationary portion arranged at the second axial end of the rotor, wherein an inlet passage extends into the separation space via the first or second stationary portion, a light phase outlet passage extends from the separation space via the first or second stationary portion, and a heavy phase outlet passage extends from the separation space via the first or second stationary portion, wherein the heavy phase outlet passage comprises at least one channel extending within the rotor from a radially outer portion of the separation space towards a central portion of the rotor, wherein each of the inlet passage, the light phase outlet passage, and the heavy phase outlet passage is mechanically hermetically sealed between the rotor and respective of the first and second stationary portions, wherein the inlet passage enters the rotor centrally on the axis of rotation at R0, the heavy phase outlet passage exits the rotor at a first radius R1, and the light phase outlet passage exits the rotor at a second radius R2, wherein R2≥R1≥R0 and R2>R0, wherein the flow control system comprises a flow control valve arranged in the light phase conduit, a liquid feed mixture measuring device, and a light phase measuring device and/or a heavy phase measuring device, wherein the method comprises steps of:

rotating the rotor;

conducting a flow of liquid feed mixture into the separation space via the liquid feed mixture conduit and the inlet passage;

separating the liquid feed mixture into a heavy phase and a light phase in the separation space;

measuring the flow of liquid feed mixture;

measuring a flow of light phase and/or a flow of heavy phase;

controlling the flow control valve based on measurements acquired in the step of measuring the flow of liquid feed mixture and measurements acquired in the step of measuring the flow of light phase and/or the flow of heavy phase; and removing the heavy phase through the heavy phase conduit extending to a heavy phase receiving container, wherein the heavy phase conduit forms an unrestricted passage from the centrifugal separator to the heavy phase receiving container when a flow of heavy phase exits from the heavy phase outlet passage to the heavy phase receiving container, wherein the step of conducting the flow of liquid feed mixture into the separation space comprises the step of:

conducting the flow of liquid feed mixture comprising a cell culture mixture to flow the cell culture mixture into the separation space, wherein the inlet passage enters a first side of the rotor parallel and centrally on the axis of rotation, and the light phase outlet passage enters the first side of the rotor parallel and offset from the axis of rotation and being separated from the inlet passage, and wherein the heavy phase outlet passage enters a second side opposite the first side of the rotor parallel and centrally on the axis of rotation.

17. The method according to claim 16, comprising a step of:

controlling a pressure of the liquid feed mixture.

18. The method according to claim 17, wherein the step of controlling the pressure of the liquid feed mixture comprises a step of:

controlling a feed pump arranged in the liquid feed mixture conduit.

19. The method according to claim 17, wherein the centrifugal separation system comprises a liquid feed mixture container, and wherein the step of controlling the pressure of the liquid feed mixture comprises a step of:

controlling a pressure within the liquid feed mixture container.

20. The method according to claim 16, wherein the centrifugal separation system comprises a shut-off valve arranged in the heavy phase conduit, and wherein the method comprises steps of:

maintaining the shut-off valve closed during an initial separation phase of separating a batch of liquid feed mixture while an interface between the light phase and heavy phase forms within the separation space; and maintaining the shut-off valve fully open during a main separation phase of separating the batch of liquid feed mixture when the interface has formed.

21. The method according to claim 16, wherein the step of controlling the flow control valve comprises a step of:

controlling the flow control valve towards a desired relationship between the flow of liquid feed mixture and the flow of light phase and/or the flow of heavy phase.

* * * * *